Figure 1:
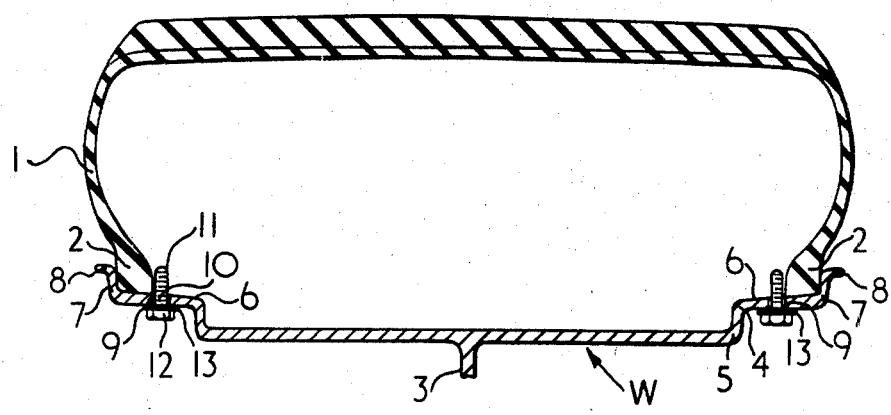

United States Patent
Mills

[15] 3,669,174
[45] June 13, 1972

[54] WHEELS

[72] Inventor: Iain C. Mills, Sutton Coldfield, England
[73] Assignee: Dunlop Holdings Limited, London, England
[22] Filed: June 17, 1970
[21] Appl. No.: 47,083

[30] Foreign Application Priority Data

June 27, 1969 Great Britain............32,551/69

[52] U.S. Cl...................................152/375, 152/386
[51] Int. Cl...................................B60b 25/20
[58] Field of Search............152/DIG. 3, 158, 375, 377, 152/381–398

[56] References Cited

UNITED STATES PATENTS

| | | | |
|---|---|---|---|
| 2,409,666 | 10/1946 | Comey | 152/DIG. 3 |
| 3,229,744 | 1/1966 | Bradley | 152/398 |
| 3,451,457 | 6/1969 | Leyer | 152/158 |
| 1,652,146 | 12/1927 | Michelin | 152/381 |

FOREIGN PATENTS OR APPLICATIONS 950,266  9/1949  France...................................152/384

Primary Examiner—James B. Marbert
Assistant Examiner—D. W. Keen
Attorney—Stevens, Davis, Miller & Mosher

[57] ABSTRACT

A wheel for a pneumatic tire, particularly for use on racing cars, provided with at least one localized projection axially inwards of the wheel rim for preventing axially inwards displacement of the tire bead from the wheel rim flange and into the wheel well. In one form of wheel, the projections are studs screwed or rivetted into the wheel. The projections are preferably provided on wheels having very wide bead seating portions.

8 Claims, 2 Drawing Figures

WHEELS

This invention relates to wheels and more particularly to wheels having wide rim flanges interspacing for use at high speeds, for example, racing motor car wheels.

Pneumatic tires, during use, occasionally suffer from an axial movement of the tire bead away from the wheel rim flange. This movement may be sufficient for the bead to move off the wheel rim for the tire bead and into the wheel well presenting a serious hazard to safety. This problem becomes increasingly more apparent at higher speeds and also at wider rim flange interspacing. It also arises when the tires are run at pressures below normal and in cases of complete loss of air pressure. The problem is accentuated by tires having, as moulded, a concave tread such that on inflation the tread is substantially flattened across the tire for the inflation forces in such a tire construction result in a bead detaching force.

According to the invention there is provided a wheel for supporting a pneumatic tire comprising a rim having a pair of circumferencially extending rim flanges in axially spaced apart relationship, rim seats for seating the bead base portions of the tire and at least one localized projection, on at least one of the rim seats, spaced apart from the rim flange whereby the toe of the tire bead is prevented by engagement with the or each projection from substantial axial displacement from its associated rim flange, during use of the wheel.

Preferably the or each projection comprises an axial extension to a stud located in screw-threaded engagement with a rim seat of the wheel. A bonding or sealing agent, e.g. a sealing compound, a washer device or both may be employed to increase the efficiency or prolong the life of the gastight seal between each stud and the rim. Alternatively the stud may be attached to the rim seat by a riveting process e.g. secured in a hole by deformation of one end of the stud.

The wheel may be provided with either one projection on one rim seat, or two projections, one on each rim seat, diametrically opposed to each other with respect to the wheel, the or each projection acting in co-operation with a wide rim seat to retain the tire bead in position, the width of the seat being substantially larger than the distance between the or each projection and its associated rim flange thereby preventing any part of the bead from leaving the rim seat in use of the wheel.

One embodiment of the invention will now be described by way of example only and is illustrated in the accompanying diagrammatic drawing which shows a cross section of a tire mounted on a wheel rim provided with tire retaining projections.

Figure 2:
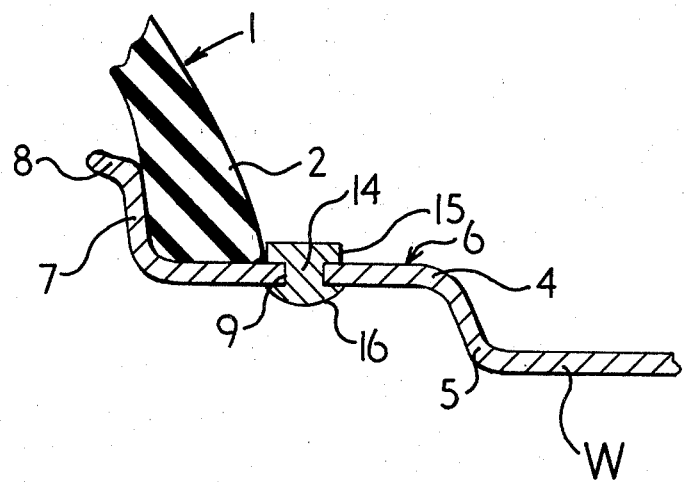

In the drawings,

FIG. 1 is a sectional view through a wheel and tire in which the projection is threaded, and FIG. 2 is a similar but partial sectional view in which the projection is riveted.

As shown in the drawing a motor car racing tire 1 having bead portions 2 is mounted on a wheel W such as a racing wheel comprising a disc 3 and a rim 4. The rim 4 has a well portion 5 of troughlike form to accommodate the tire bead in fitting the tire by known methods and two axially inwardly tapered rim seat portions 6 which are annular seats for the tire bead portions 2. The edges of the rim 4 are turned radially outwards to form rim flanges 7 which extend circumferentially around the edges of the wheel. The outer edges 8 of the rim flanges 7 are rolled slightly over in order to present a smooth surface to the tire bead.

A series of five equally spaced tapped radial holes 9 are provided in each rim seat 6 at a distance from each rim flange slightly greater than the width of the bead to be accommodated. In each hole a stud 10 is screwed; it is provided with an axial extension 11. The extension 11 is of 0.25 inch diameter and it protrudes approximately 0.5 of an inch through the rim seat when the stud is screwed down until its head 12 abuts the radially inner face of the rim.

In use the studs are first unscrewed so that the projecting extensions 11 do not obstruct the tire bead as it is forced along the bead seat on fitting and inflating the tire. The studs are then screwed in until the shoulders 12 abut the rim. The axial extensions 11 then prevent the tire bead moving towards the well of the wheel. In the FIG. 2 construction the stud 14 is formed with a head 15 and positioned in the hole 9. The end 16 further from the head is then peened over in the usual rivetting process to form a seal.

The studs are made airtight in the rims by fitting sealing washers 13 between the bead 12 and the wheel rim. Alternatively, or additionally, the threads on the studs are coated with a bonding or sealing agent.

Having now described my invention — What I claim is:

1. A wheel for supporting a pneumatic tire comprising a rim, a pair of circumferentially extending rim flanges in axially spaced apart relationship, rim seats for seating the bead base portions of the tire; two localized projections, one on each rim seat, each projection being axially spaced apart from its associated rim flange and diametrically opposed to the other projection with respect to the wheel, at least one of said projections being mounted in an opening in said rim seat so as to be removable from the outside of the wheel, said projection preventing substantial axial displacement of the tire bead from its associated rim flange during use of the wheel.

2. A wheel as in claim 1 wherein the said at least one of said projections comprises a stud rivetted to the rim seat.

3. A wheel as in claim 1 wherein the projection is screwed stud and said opening has engaging threads whereby the screwed stud is capable of being unscrewed from the rim to allow tire fitting.

4. A wheel as in claim 3 wherein the screwed stud is provided with a sealing means to prevent air loss from the tire.

5. A wheel as in claim 4 wherein the screwed stud is formed with a head and a sealing means comprises a sealing washer between the head and the rim seat.

6. A wheel as in claim 1 wherein the projection comprises a member of 0.25 inches diameter and about 0.5 inches in height from the rim seat.

7. A racing car wheel as in claim 1.

8. A wheel according to claim 1 wherein the axial width of the rim seats is substantially wider than the axial distance between each projection and its associated rim flange whereby any part of either tire bead is prevented from leaving the rim seats in use of the wheel.

* * * * *